Patented Nov. 2, 1965

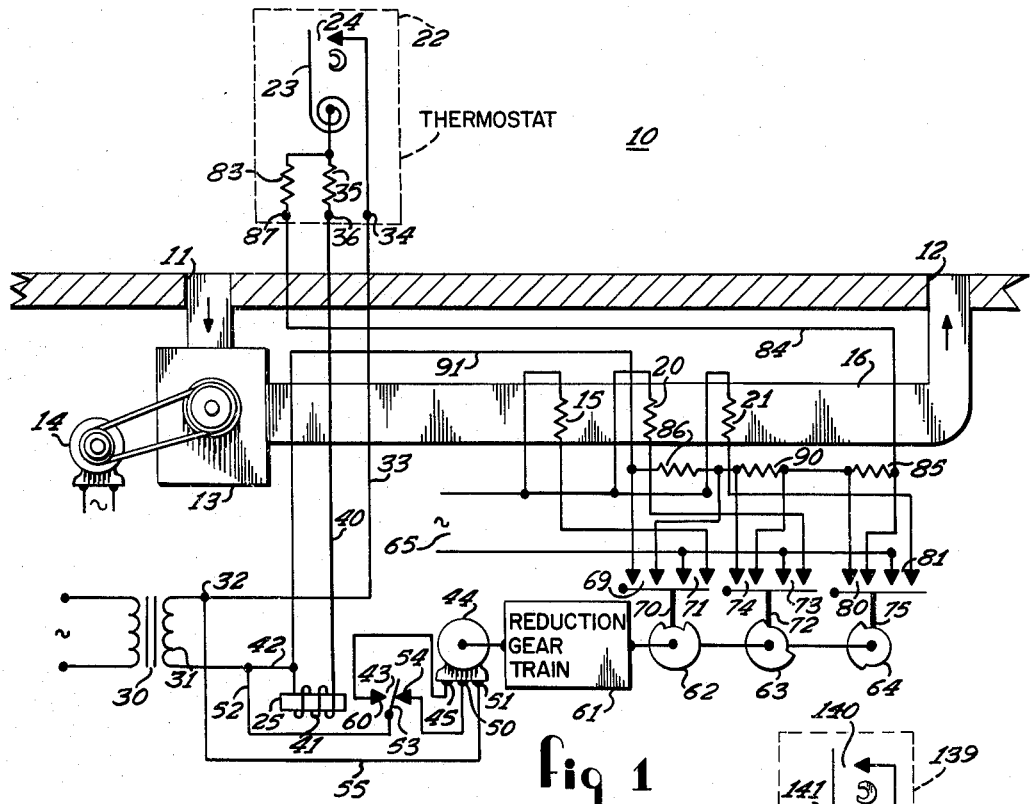
Nov. 2, 1965 L. W. NELSON ETAL 3,215,348
MULTI-STAGE TEMPERATURE CONTROL APPARATUS
Filed June 3, 1963
INVENTORS
LORNE W. NELSON
JOSEPH O. THORSHEIM
BY
Clyde C. Blinn
ATTORNEY United States Patent Office 3,215,348

1

3,215,348
MULTI-STAGE TEMPERATURE CONTROL APPARATUS

Lorne W. Nelson, Bloomington, and Joseph O. Thorsheim, Minneapolis, Minn., assignors to Honeywell Inc., a corporation of Delaware Filed June 3, 1963, Ser. No. 285,089
4 Claims. (Cl. 236—68)

The present invention is concerned with an improved temperature control system; in particular, the control system has a cycling thermostat for controlling a modulating or multistage temperature conditioning apparatus with means for artificially modifying the control point of the thermostat as the temperature conditioning apparatus increases in capacity.

Normally, when a modulating or multistage temperature conditioning system is controlled by a space thermostat having "heat anticipation," the cycling pattern and thus the amount of "on-time" of the thermostat changes to regulate the capacity of the temperature conditioning apparatus to satisfy the conditioning load of the space. With "heat cycler," a considerable amount of stability is placed into a system. The stability comes about by the fact that "cycler heat" places a "droop" on the control system. Thermostat designers have been faced with the problems of "droop" in conditioning systems for years. In the Marcus E. Fiene Patent 2,295,340, the thermostat "droop" is extensively considered and reduced using off cycle heat with a thermal mass in the thermostat housing.

In the present invention, a cycling thermostat having a small resistance heater located in the main housing of the thermostat for "heat cycling" is connected to control a reversible electric motor used to operate a modulating or staging conditioning source. The speed of the motor in the forward or reverse direction might be the same. With any particular heating load such as a 25 percent heating load, if the thermostat is satisfied, the cycling rate of the thermostat is such that the thermostat is calling for heat half of the time and satisfied the other half. Under such conditions, the reversible motor moves forward a certain amount and then backward the same amount to cycle about a given position and keep the average heating output of the conditioning apparatus relatively constant. If the heating load changes, for example to 75 percent, the thermostat begins to cycle with longer on-times until the reversible motor creeps forward to a new position with a greater output capacity of the conditioning apparatus. At the 75 percent heating load level, the thermostat again is satisfied and the cycling rate of the thermostat is at the 50–50 percent type of operation. When the thermostat is satisfied and is operating at a 50–50 percent operation rate, the thermostat has no way of knowing the heating load. In other words, in such a system, the "cycler heat" produces no "droop" in the system at various loads and the system might be described as a "droop-less" system.

The present invention recognizes that such a system needs some "droop" for stability. Specifically, a signal is fed back from the conditioning apparatus to artificially satisfy the space thermostat. In this manner, the temperature of the space may tend to vary slightly from the control setting; however, a high degree of stability is attained for only a small amount of "droop."

An object of the present invention is to provide an improved temperature control system wherein a cycling thermostat controls a modulating temperature conditioning apparatus and a feedback signal is available to impose "droop" on the thermostat as the output of the temperature changing apparatus increases.

Another object of the present invention is to provide a

2 temperature responsive means for controlling a cycling modulating temperature conditioning apparatus having a reversible actuator driven at a constant speed in either the forward or reverse direction with means for modifying the control point of the space temperature responsive means as the output of the changing apparatus varies.

These and other objects of the present invention will become apparent upon the study of the fine specification and drawing of which FIGURE 1 is a schematic representation of a temperature control system wherein a space thermostat controls a plurality of stages of electric heating and a feedback signal to the space thermostat is provided when each stage of heating is energized.

FIGURE 2 is a schematic representation of a second embodiment of the present invention wherein a space thermostat controls a modulating temperature changing apparatus and a modulating feedback signal is provided to the space thermostat as the output of the changing apparatus increases.

FIGURE 3 is another embodiment of a thermostat having a "heat cycler" heater and a "droop" heater.

Referring to FIGURE 1, a space 10 is conditioned by circulating air from the space through a return duct 11 and from a supply duct 12 under the power of a conventional fan 13 which is driven by a constant speed motor 14. Located in duct 12 are three electrical heaters 15, 20, and 21 which can be energized to heat the air delivered to space 10.

The control of the energization of the heaters is accomplished by a thermostat 22 having a temperature responsive or bimetal actuator 23 for controlling a switch 24. Upon switch 24 closing, a relay 25 is energized to bring about the energization of the mentioned heaters. The source of power 30 has a secondary 31 which is connected to energize relay 25 through a circuit through each as follows: from the upper terminal 32 of the secondary, a conductor 33, a terminal 34 of thermostat 22, switch 24, a heater or resistance element 35, a terminal 36, a conductor 40, energization winding 41 of relay 25, and back to the other side of the source of power through a conductor 42.

Relay 25 controls a single pole-double throw switch 43 which controls the energization of a reversible motor 44. Motor 44 is of a conventional type similar to that shown in the Ralph T. Osen Patent 3,050,610 wherein the energization of the motor between terminals 45 and 51 when relay 25 is energized drives the motor in a counterclockwise direction at a predetermined speed and the energization of the motor between terminals 50 and 51 drives the motor in a clockwise direction at the same predetermined speed. Switch 43 is connected to motor 44 in the following manner: from conductor 42 or the lower side of secondary 31, a conductor 52, a movable element 53 of switch 43, a stationary contact 54 which is connected to motor terminal 50, and back to the other side of the source of power through motor terminal 51 and conductor 55. When relay 25 is energized, member 53 moves against stationary contact 60 which is connected to terminal 45 of the motor.

A conventional reduction gear train 61 connects the output shaft of motor 44 to three cam operators 62, 63, and 64, respectively. When a cam rider 70 of cam 62 raises on the high portion of the cam as the cam rotates in a counterclockwise direction switches 69 and 71 are closed. Switch 71 connects heater 15 to a source of power. Further movement of motor 44 in the counterclockwise direction causes a rider 72 to lift on the high portion of cam 63 to close switches 73 and 74. Switch 73 connects heater 20 to a source of power 65. A cam rider 75 associated with cam 64 closes switches 80 and 81 when the rider raises on the high portion of cam 64. Switch 81 controls the energization of heater 21.

A feedback circuit is provided to thermostat 22 for feeding back a signal to the thermostat to stabilize the control system. The feedback signal is accomplished whenever additional heat is being supplied to the space by heaters 20 and 21 by means of an additional heater 83 in the thermostat to artificially heat the thermostat. Heater 83 is connected in a normal energization circuit traced as follows: from terminal 32 of secondary 31, conductor 33, switch 24, heater 83, a terminal 87, conductor 84, resistance 85, resistance 90, resistance 86, conductor 91, and back to the other side of the source of power through conductor 42. Switch 69 is connected in parallel with resistance 86, switch 74 is connected in parallel with resistance 90, and switch 80 is connected in parallel with resistance 85 whereby upon the closure of either switches 69, 71, or 80, resistances 86, 90, and 85, respectively are shunted.

When the switch operator or motor 44 is in the position shown, both resistors 86, 85, and 90 are in the circuit and a minimum current flows through heater winding 83 when switch 24 is closed.

*Operation of FIGURE 1*

Upon a call for the need of heat in space 10, thermostat 22 closes switch 24 to bring about the energization of motor 44. Switch operating cam 62, 63, and 64, are driven slowly counterclockwise to operate the system switches in a sequence. Upon the closure of switch 71, the first stage of heating is energized. With the use of heater 35, a conventional "heat anticipation" circuit is provided to bring about a cycling in the operation of thermostat 22. As the thermostat cycles, relay 25 is first energized and then de-energized so the motor 44 slowly moves the mentioned cams counterclockwise and then clockwise. Depending upon the temperature in space 10 which is indicative of the heating load of the space, the position of the output of motor 44 will be determined. The cycling operation produced by heater 35 will result in an energization by pulses and thus an averaging of the position of cam 62, 63, and 64 depending upon the heating load.

With a motor having the same forward and reverse operation speeds, an equilibrium condition will be reached with the thermostat cycling at 50% on and 50% off. For example, at a given heating load of space 10, such as 25%, once the thermostat becomes satisfied a 50–50% thermostat cycling rate is obtained and the heating source, such as heater 15, will be cyclically energized. Upon a change in the heating load, the cycling of the thermostat will change. For example, if the outdoor temperature drops, the heating load might increase to 50% which would result in the thermostat on cycle to become longer. The motor is then advanced to a new position and the heating output of the heaters 15, 20, and 21 is increased. When equilibrium is again reached at the new 50% load, the 50–50% thermostat cycling will again be reached. With such a system, the thermostat does not know what the heating load is when an equilibrium or satisfied condition of 50–50% cycling rate is maintained.

As previously mentioned, the absence of "droop" in a system results in unstability. Since the thermostat cycles at the 50–50% rate when the system is satisfied, no droop is present and the system would be unstable.

When cam 63 moves to a position to close switch 73 to energize the second stage of heating, switch 74 shunts out the resistance 90 to increase the feedback heat signal to the thermostat accomplished by the energization of heater 83. The signal tends to satisfy the thermostat and results in the opening of switch 24 to drive the motor 44 in the opposite direction to reduce the total quantity of heat supplied by the heater 20.

Obviously, the addition of the feedback signal through heater 83 adds a control point "droop" to the system. The feedback signal stabilizes the system and prevents the control of motor 44 from cycling about wide limits to cause the temperature in space 10 to vary drastically on each side of the selected control point.

While motor 44 is described to have the same speed in the forward and reverse directions, obviously a motor having one forward speed and a different reverse speed could be controlled with similar thermostat except a satisfied or equilibrium condition would exist at some other cycling rate such as 40–60%.

*Description of FIGURE 2*

Referring to FIGURE 2, a thermostat 100 controls the temperature in a space to which the output of a burner is supplied when the burner is energized by fuel being delivered through a valve 101. Thermostat 100 has a switch 102 which is closed when the temperature of the space drops below some predetermined value as determined by a bimetal 103. When switch 102 closes, a relay 104 is energized through a circuit traced as follows: from the upper end of a secondary winding 105 of a source of power 110, a conductor 111, a heater 112 in thermostat 100, switch 102, a terminal 113, a conductor 114, a winding 115 of relay 104, and back to the other side of the source of power through a conductor 120. When relay 104 is energized, a single pole-double throw switch 121 controls the energization of a reversible motor 122 which is of the same type as described in FIGURE 1. When relay 104 is de-energized, motor 122 runs in one direction at a constant speed of rotation and when the relay 104 is energized, motor 122 runs in the other direction at a constant speed of rotation.

Heater 112 provides the "heat anticipation" for thermostat 100. As the thermostat switch 102 closes, relay 104 is energized and the modulating valve increases the flow of fuel to the burner. Valve 101 might be a pressure regulating type which has a modulating pressure depending upon the output of shaft 123 which is connected to motor 122 through a gear train 124. Pressure regulating valves which modulate the pressure of fuel to a burner are quite conventional. One valve of this type is shown in the William J. Harris, Jr., Patent 1,762,133.

As motor 122 drives the adjustment of the pressure regulating valve 101 to increase the flow of fuel to the burner, wiper 130 on a potentiometer winding 131 moves in a counterclockwise direction to decrease the resistance in the thermostat circuit traced as follows: from terminal 113, a conductor 132, resistance 131, wiper 130, a conductor 133, and back to the other side of the thermostat circuit at conductor 120.

*Operation of FIGURE 2*

Upon a call for heat by thermostat 100, switch 102 is closed to drive motor 122 in a direction to increase the pressure output of the fuel supply to burner by readjusting the pressure regulating valve 101. The adjustment of the pressure regulating valve is done in a modulating manner by the motor 122 through the reduction gear train 124. With the heat anticipation heater 112, thermostat switch 102 cycles at a rate depending upon the heating load of the space. The cycling of the thermostat results in the energization of the motor in one direction or the other so the position of the pressure regulating valve is determined by the heating load of the space as determined by thermostat 100.

As the regulating valve 101 is readjusted to supply more fuel to the burner, a feedback signal is placed on the thermostat by increasing the current passing through heater 112. The increase in current is accomplished by decreasing the amount of resistance of winding 131 which is in parallel to the relay circuit of the thermostat. The amount of feedback produces a droop in the control point of thermostat 100 which has been found to stabilize the temperature control system.

Description and operation of FIGURE 3

FIGURE 3 is another embodiment of a thermostat 139 having a switch 140 controlled to close when bimetal 141 decreases in temperature below some predetermined value. A heater 142 is a conventional "heat anticipation" heater as heater 35 in FIGURE 1. Heater 143 is a "droop" heater which is connected by terminals 144 and 145 to the feedback circuit of FIGURE 1 or 3. Since the energization circuit of heater 143 is not in series with switch 140, the feedback signal is a steady signal of a magnitude depending on the motor or actuator position. Thermostat 139 could be connected to the system of FIGURE 1 by connecting terminals 144, 150, and 145 to terminals 86, 36, and 34, respectively of FIGURE 1. As motor 44 in FIGURE 1 advanced cams 63 and 64, switches 74 and 80 would close to change the resistance in the energization circuit of heater 143 to maintain a steady feedback signal to the thermostat depending on the conditioning source output.

While we have described the invention in one particular manner, the intent is to limit the scope of the invention by the scope of the patent claims in which we claim:

1. In a temperature control system for controlling a multistage temperature conditioning apparatus,
    a space temperature responsive switch means, said switch means closing when the temperature of a space reaches a predetermined value,
    a slow operating reversible motor having the same speed in the forward and reverse directions,
    relay means for connecting said switch means to control said reversible motor, said space temperature switch means having an artificial heater for heating said space responsive means when said switch means is closed and said motor means is operating in said forward direction, said heater providing heat anticipation to cause said space responsive means to cycle said motor means to maintain an average motor position indicative of heating load in said space,
    means connecting said motor to control the multistage heating apparatus whereby the number of stages operating is indicative of said heating load,
    a second artificial heater in said space responsive means,
    and electrical means including said space switch means connecting said heater to be energized by an amount indicative of the number of stages of said apparatus which are operating to provide a feedback signal to stabilize said system.

2. In a temperature control system for controlling a multistage temperature conditioning apparatus,
    space temperature responsive switch means, said switch means closing when the temperature of a space reaches a predetermined value,
    heater means mounted in thermal relation to said space temperature responsive switch means for artificially heating said temperature responsive switch means,
    slow operating reversible motor means having the same speed in the forward and reverse directions,
    means for connecting said temperature responsive switch means to control said reversible motor means, said space temperature responsive switch means being artificially heated by said heater means when said space temperature responsive switch means is closed and said motor means is operating in one of said directions, said heater providing heat anticipation to cause said space temperature responsive means to become satisfied whereby said motor means moves in one of said directions and then the other to maintain an average position of said motor means indicative of a heating load in said space,
    means adapted to connect said motor means to control the operation of a multi-stage heating apparatus whereby the number of stages operating is indicative of said heating load,
    electrical circuit means directly controlled by said motor means including said space temperature responsive switch means connecting said heater to be energized by an amount indicative of the number of stages of said apparatus which are operating to provide feedback signal to said space temperature responsive means to stabilize the control system.

3. In a temperature control system for controlling a multistage temperature conditioning apparatus,
    space temperature responsive switch means,
    heater means mounted in said space temperature responsive switch means for artificially heating said responsive means,
    slow operating reversible motor means connected for controlling the multi-stage conditioning system by varying the number of stages of conditioning apparatus operating,
    a source of power,
    first electrical circuit means including said switch means and said heater means for connecting said source to said motor means,
    variable resistance means connected to and adjusted by said motor means,
    electrical circuit means connecting said variable resistance means to said first electrical circuit means to modify the energization of said heater means by an amount indicative of the number of stages of conditioning apparatus operating to provide a feedback signal to said temperature responsive means to stabilize the system.

4. In a temperature control system for controlling a multistage temperature conditioning apparatus,
    space temperature responsive means,
    first means for artificially satisfying said temperature responsive means,
    reversible motor means adapted to control the multistage temperature conditioning apparatus,
    circuit means connecting said space temperature responsive means to said motor means and said first means for artificially satisfying said temperature responsive means whereby said motor means is energized in a first direction and then the opposite direction,
    electrical means connected to be operated by said motor means,
    and circuit means connecting said electrical means to said first mentioned circuit means to modify the operation of said space temperature responsive means by changing the energization of said first means as the number of stages of the multistage temperature conditioning apparatus energized increases.

References Cited by the Examiner
UNITED STATES PATENTS

| | | | |
|---|---|---|---|
| 1,654,759 | 1/28 | Shultz. | |
| 2,059,362 | 11/36 | Kimball | 236—68 |
| 2,061,536 | 11/36 | Dillman | 236—68 X |
| 2,156,082 | 4/39 | Crago | 236—68 |
| 2,262,341 | 11/41 | Shaw | 236—68 |
| 2,272,769 | 2/42 | Crago | 236—68 |
| 2,295,340 | 9/42 | Fiene | 236—68 |
| 2,425,998 | 8/47 | Crise | 236—68 X |
| 2,981,479 | 4/61 | Kyle | 236—68 |
| 3,028,471 | 4/62 | Bennett | 236—1 X |
| 3,050,610 | 8/62 | Osen | 219—20.5 |

ALDEN D. STEWART, *Primary Examiner.*

WILLIAM F. O'DEA, *Examiner.*